US011247193B2

(12) United States Patent
Bernadet et al.

(10) Patent No.: US 11,247,193 B2
(45) Date of Patent: Feb. 15, 2022

(54) PROCESS FOR PREPARING A MONOLITH WITH MULTIMODAL POROSITY

(71) Applicant: IFP Energies Nouvelles, Rueil-Malmaison (FR)

(72) Inventors: Sophie Bernadet, Merignac (FR); Antoine Fecant, Brignais (FR); Denis Uzio, Oullins (FR); Renal-Vasco Backov, Bordeaux (FR); Serge Ravaine, Cestas (FR)

(73) Assignee: IFP Energies Nouvelles, Rueil-Malmaison (FR)

(*) Notice: Subject to any disclaimer, the term of this patent is extended or adjusted under 35 U.S.C. 154(b) by 181 days.

(21) Appl. No.: 16/608,342

(22) PCT Filed: Apr. 23, 2018

(86) PCT No.: PCT/EP2018/060379
§ 371 (c)(1),
(2) Date: Oct. 25, 2019

(87) PCT Pub. No.: WO2018/197434
PCT Pub. Date: Nov. 1, 2018

(65) Prior Publication Data
US 2021/0101134 A1  Apr. 8, 2021

(30) Foreign Application Priority Data

Apr. 28, 2017  (FR) .................................. 1753759

(51) Int. Cl.
| | |
|---|---|
| *B01J 21/18* | (2006.01) |
| *B01J 21/06* | (2006.01) |
| *B01J 23/10* | (2006.01) |
| *B01J 35/00* | (2006.01) |
| *B01J 35/04* | (2006.01) |
| *B01J 35/08* | (2006.01) |
| *B01J 35/10* | (2006.01) |
| *B01J 37/04* | (2006.01) |
| *B01J 37/08* | (2006.01) |

(52) U.S. Cl.
CPC ............ *B01J 21/18* (2013.01); *B01J 21/063* (2013.01); *B01J 23/10* (2013.01); *B01J 35/004* (2013.01); *B01J 35/0013* (2013.01); *B01J 35/0033* (2013.01); *B01J 35/04* (2013.01); *B01J 35/08* (2013.01); *B01J 35/109* (2013.01); *B01J 35/1038* (2013.01); *B01J 35/1042* (2013.01); *B01J 35/1057* (2013.01); *B01J 35/1061* (2013.01); *B01J 35/1066* (2013.01); *B01J 35/1071* (2013.01); *B01J 35/1076* (2013.01); *B01J 37/04* (2013.01); *B01J 37/084* (2013.01)

(58) Field of Classification Search
CPC . B01J 21/18; B01J 21/063; B01J 23/10; B01J 35/0013; B01J 35/0033; B01J 35/004; B01J 35/04; B01J 35/08; B01J 35/1038; B01J 35/1042; B01J 35/1057; B01J 35/1061; B01J 35/1066; B01J 35/1071; B01J 35/1076; B01J 35/109; B01J 37/04; B01J 37/084
USPC ....... 502/304, 305, 337–338, 343, 345, 353, 502/355; 264/29.1, 681
See application file for complete search history.

(56) References Cited

U.S. PATENT DOCUMENTS

| | | | |
|---|---|---|---|
| 4,888,309 A | 12/1989 | Araya | |
| 5,935,898 A | 8/1999 | Trubenbach et al. | |
| 7,384,612 B2 | 6/2008 | Ajisaka et al. | |
| 9,908,100 B2 | 3/2018 | Boscaro et al. | |
| 2003/0157248 A1* | 8/2003 | Watkins ................ B29C 67/202 427/256 |
| 2010/0075836 A1* | 3/2010 | Hugener-Campbell .................... B01J 23/06 502/159 |
| 2011/0124492 A1* | 5/2011 | Loukine ................ B01J 35/0013 502/159 |
| 2016/0144350 A1* | 5/2016 | Aizenberg ............... B01J 23/52 502/159 |
| 2018/0200692 A1 | 7/2018 | Ferguson et al. | |

(Continued)

FOREIGN PATENT DOCUMENTS

| | | |
|---|---|---|
| EP | 1477643 B1 | 1/2014 |
| FR | 2975309 A1 | 11/2012 |

(Continued)

OTHER PUBLICATIONS

Esther Carbonell et al: "Enhancement of TiO2 photocatalytic activity by structuring the photocatalyst film as photonic sponge", Photochemical and Photobiological Sciences, vol. 7, No. 8, Jan. 1, 2008 (Jan. 1, 2008), GB, pp. 931, XP055435426, ISSN: 1474-905X.

(Continued)

*Primary Examiner* — Patricia L. Hailey
(74) *Attorney, Agent, or Firm* — Millen, White, Zelano and Branigan, P.C.; Harry B. Shubin

(57) ABSTRACT

Process for preparing a porous monolith comprising between 10% and 100% by weight of a semiconductor relative to the total weight of the porous monolith, which process comprises the following steps:
a) a first aqueous suspension containing polymer particles is prepared;
b) a second aqueous suspension containing particles of least one inorganic semiconductor is prepared;
c) the two aqueous suspensions prepared in steps a) and b) are mixed in order to obtain a paste;
d) a heat treatment of the paste obtained in step c) is carried out in order to obtain the monolith with multimodal porosity.

15 Claims, No Drawings

(56) References Cited

U.S. PATENT DOCUMENTS

| | | | |
|---|---|---|---|
| 2018/0200693 A1 | 7/2018 | Ferguson et al. | |
| 2018/0207615 A1 | 7/2018 | Ferguson et al. | |
| 2020/0179916 A1* | 6/2020 | Fairen-Jimenez | ............................ B01J 20/28019 |
| 2021/0106977 A1* | 4/2021 | Bernadet | .................. B01J 23/10 |

FOREIGN PATENT DOCUMENTS

| | | | |
|---|---|---|---|
| JP | 2009007219 A | 1/2009 | |
| WO | 15110772 A1 | 7/2015 | |
| WO | 17009427 A1 | 1/2017 | |
| WO | 17009432 A1 | 1/2017 | |
| WO | 17009434 A1 | 1/2017 | |

OTHER PUBLICATIONS

International Search report for WO17009434 dated Jun. 19, 2018 (pp. 1-3).

\* cited by examiner

PROCESS FOR PREPARING A MONOLITH WITH MULTIMODAL POROSITY

TECHNICAL FIELD

The field of the invention is that of materials with a hierarchical structure. More particularly, the present invention relates to a process for preparing a monolith with multimodal porosity containing at least one inorganic semiconductor.

PRIOR ART

It is known from the prior art to prepare monoliths based on inorganic oxides having multiple porosities, and in particular a macroporosity obtained by means of a direct emulsion forming process.

A. Araya et al. (U.S. Pat. No. 4,888,309, 1981) and A. Imhof et al. (Nature, vol. 389, 30 Oct. 1997, p. 948-952) describe the implementation of sol-gel processes using alkoxides dissolved in an alcohol and hydrolyzed by addition of a small amount of water, it being recalled that most alkoxides are highly reactive with water and do not give stable emulsions. This document also describes the preparation of monodisperse macroporous materials of titanium oxide, of zirconia or silica with pore diameters between 50 nm and several macrometers, from a monodisperse emulsion of oil in formamide.

A patent application WO 2015/110772 describes the use of a material based on N—$TiO_2$ in the form of a porous monolith as a photocatalyst for the degradation of pollutants in air or in water under radiation in the visible spectrum or for cracking water to H2 under radiation in the visible spectrum.

E. Carbonell et al. (Photochem. Photobiol. Sci., 2008, 7, p. 931-935) describe a route for preparing a $TiO_2$ film a few micrometers thick, the porosity of which is structured by latex beads. The authors emphasize that the smaller the thickness of the film, the more effective the material is in photocatalysis.

Another patent application FR 2 975 309 describes a method for preparing a porous monolith containing $TiO_2$ and use thereof as a photocatalyst for the degradation of pollutants in air or in water under irradiation.

It is also known, from M. Tahir and N. S. Amin (Appl. Catal. A: General 467 (2013) 483-496 and Chem. Eng. J., 230 (2013) 314-327), to use a monolith of "honeycomb" type containing channels of millimetric size coated with a semiconductor compound.

Nevertheless, the preparation processes derived from the prior art do not make it possible to obtain porous monoliths containing at least one inorganic semiconductor with fine control of the porosity of the material. The applicant proposes a new process for preparing a porous monolith wherein the porosity of said porous monolith is controlled. In addition, the preparation process according to the invention involves oxide inorganic semiconductor precursors in the form of a powder. Thus, compared with the preparation methods known from the prior art, it is not necessary to use reactive precursors of an inorganic semiconductor (such as alkoxides), this thus allowing, on the one hand, a saving in terms of production cost of the porous monolith and, on the other hand, an increased variability in the nature of the constituent semiconductors of the porous monolith.

These properties enable the monoliths prepared according to the invention to be advantageously used in photocatalytic applications.

SUBJECTS OF THE INVENTION

The invention relates to a process for preparing a monolith with multimodal porosity containing at least one inorganic semiconductor. Said preparation process uses polymer particles as pore-forming agent. Said preparation process uses a powder of one or more precursors of a semiconductor in their oxide form. Said preparation process is carried out according to the following method:
a) a first aqueous suspension containing polymer particles is prepared;
b) a second aqueous suspension containing particles of at least one inorganic semiconductor is prepared;
c) the two aqueous suspensions prepared in steps a) and b) are mixed in order to obtain a paste;
d) a heat treatment of the paste obtained in step c) is carried out in order to obtain the monolith with multimodal porosity, said heat treatment carried out under air at a temperature of between 300 and 1000° C. for 1 to 72 h.

The monolith prepared according to the invention contains 10% to 100% by weight of inorganic semiconductor relative to the total weight of the porous monolith, preferably from 20% to 100% by weight. The bandgap of the inorganic semiconductors is generally between 0.1 and 4.0 eV. Preferably, the semiconductor is a metal oxide. When the weight content of inorganic semiconductor relative to the total weight of the porous monolith is less than 100%, said porous monolith may preferably comprise a refractory oxide chosen from alumina, silica or silica-alumina, or any other material which is not an inorganic semiconductor.

According to one variant, the metal of the inorganic semiconductor can be chosen from one or more elements of groups IB, IIB, IVA, VA, VIA, IVB, VB, VIB, VIIIB or IIIA. Preferably, a semiconductor is chosen from $Fe_2O_3$, SnO, $SnO_2$, $TiO_2$, CoO, NiO, ZnO, $Cu_2O$, CuO, $Ce_2O_3$, $CeO_2$, $In_2O_3$, $WO_3$, $V_2O_5$, alone or as a mixture. The semiconductor can optionally be doped with one or more elements chosen from metal elements, such as for example elements V, Ni, Cr, Mo, Fe, Sn, Mn, Co, Re, Nb, Sb, La, Ce, Ta or Ti, non-metal elements, such as for example C, N, S, F or P, or by a mixture of metal and non-metal elements.

The porous monolith obtained according to the invention has a mesoporous volume, the pore diameter of which is between 0.2 and 50 nm, of between 0.05 and 1 ml/g, preferably between 0.1 and 0.5 ml/g.

The porous monolith obtained according to the invention has a macroporous volume, the pore diameter of which is greater than 50 nm and less than or equal to 5000 nm, preferably greater than 50 nm and less than or equal to 2000 nm, of between 0.01 and 1 ml/g, preferably between 0.05 and 0.5 ml/g.

The macroporous and mesoporous volumes are measured by mercury intrusion porosimetry according to standard ASTM D4284-83 at a maximum pressure of 4000 bar, using a surface tension of 484 dyne/cm and a contact angle of 140°.

DETAILED DESCRIPTION OF THE INVENTION

Definition

In the remaining text, the groups of chemical elements are given according to the CAS classification (CRC Handbook of Chemistry and Physics, published by CRC Press, editor-in-chief D. R. Lide, 81$^{st}$ edition, 2000-2001). For example, group VIII according to the CAS classification corresponds to metals of columns 8, 9 and 10 according to the new IUPAC classification.

Description

The invention relates to a process for preparing a monolith with multimodal porosity containing at least one inorganic semiconductor. The preparation process according to the invention uses polymer particles as pore-forming agent. The preparation process uses a powder of one or more precursors of a semiconductor in their oxide form. More particularly, the preparation process according to the invention comprises the following steps:

a) a first aqueous suspension containing polymer particles is prepared;
b) a second aqueous suspension containing particles of at least one inorganic semiconductor is prepared;
c) the two aqueous suspensions prepared in steps a) and b) are mixed in order to obtain a paste;
d) a heat treatment of the paste obtained in step c) is carried out in order to obtain the monolith with multimodal porosity.

The steps of the preparation process are described in greater detail below.

Step a) (Preparation of the First Aqueous Suspension)

During step a) of the process for preparing the porous monolith according to the invention, preferably at ambient temperature, a first aqueous suspension containing polymer particles is prepared.

The polymer particles are mainly in the form of spheres with a diameter of between 0.1 and 5 μm, preferably between 0.3 and 3 μm. The particles may be compounds of any polymer; preferably, the particles are composed of optionally modified polystyrene.

The aqueous suspension contains polymer particles in an amount of from 20 to 500 g/l. The aqueous suspension has a pH of between 1 and 10, preferably between 2 and 8.

The polymer particles may be commercially available or synthesized by any method known to those skilled in the art. When the polymer particles are synthesized and are composed of polystyrene, the following process may be carried out:

i) a solution of ethanol and polyvinylpyrrolidone (PVP) is prepared, which solution is degassed under a nitrogen stream for at least one hour. The solution optionally contains water. The weight ratio of ethanol to PVP is between 50 and 200;
ii) the solution is heated to a temperature of between 50 and 90° C.;
iii) a reactive mixture of styrene and of a polymerization initiator is prepared, which mixture is degassed under nitrogen for at least one hour. The weight ratio of styrene to initiator is between 30 and 300. Preferably, the polymerization initiator is 2,2'-azobis(2-methylpropionitrile) (AIBN);
iv) the reactive mixture obtained in step iii) is added to the solution obtained in step ii) at a temperature of between 50 and 90° C., with stirring. The reactive system is kept stirring at a temperature of between 50 and 90° C. for 1 hour to 48 hours;
v) the suspension obtained is washed at least twice, preferably at least three times, with water, preferably with distilled water, then
vi) the polymer particles are recovered by filtration or centrifugation.

Step b) (Preparation of the Second Aqueous Suspension)

During step b) of the process for preparing the porous monolith according to the invention, preferably at ambient temperature, a second aqueous suspension containing particles of at least one inorganic semiconductor is prepared.

Advantageously, said semiconductor is in the form of powder advantageously comprising particles with a diameter of between 5 and 200 nm, preferably between 10 and 100 nm. The inorganic semiconductor is in an oxide form. The semiconductor may be commercially available or synthesized by any method known to those skilled in the art.

The aqueous suspension has an acid pH, preferably of between 0 and 4. Any compound may be used as acid agent; preferably, the acid agent will be nitric acid or hydrochloric acid.

Said aqueous suspension contains the semiconductor in an amount of from 200 to 900 g/l.

According to one variant, said aqueous suspension may also contain, in any proportion, a metal alkoxide, preferably a titanium, silicon or aluminum alkoxide, alone or as a mixture.

Step c) (Mixing of the Suspensions)

During step c) of the process for preparing the porous monolith according to the invention, preferably at ambient temperature, the two aqueous suspensions prepared in steps a) and b) are mixed in order to obtain a paste.

The two suspensions are mixed and then poured into a mold of the shape desired for the final monolith.

The weight ratio between the suspensions containing the polymer particles and containing the semiconductor particles is between 0.05 and 1, preferably between 0.1 and 0.7.

Step d) (Heat Treatment)

During step d) of the process for preparing the porous monolith according to the invention, a heat treatment of the paste obtained in step c) is carried out in order to obtain the porous monolith, said heat treatment being carried out under air at a temperature of between 300 and 1000° C. for 1 to 72 h.

Preferably, the heat treatment under air is carried out in several plateaus, a first plateau carried out at a temperature of between 70 and 130° for 1 to 12 h, and a second plateau carried out at a temperature of between 130° C. and 220° for 1 to 12 h, and a third plateau carried out at a temperature of between 250 and 700° C. for 1 to 12 h. The recourse to three temperature plateaus allows a progressive nature of the heat treatment, avoiding the formation of cracks on the material, while at the same time ensuring good mechanical strength of said material.

The specific heat treatment of the preparation process according to the invention makes it possible to precisely control the final porosity of the monolith by combustion of the polymer particles, then releasing a porosity calibrated by the size of said particles.

The monolith prepared according to the invention contains 10% to 100% by weight of inorganic semiconductor relative to the total weight of porous monolith, preferably from 20% to 100% by weight. The bandgap of the inorganic semiconductors is generally between 0.1 and 4.0 eV. Preferably, the semiconductor is a metal oxide.

According to one variant, the metal of the inorganic semiconductor can be chosen from one or more elements of groups IB, IIB, IVA, VA, VIA, IVB, VB, VIB, VIIIB or IIIA. Preferably, a semiconductor is chosen from $Fe_2O_3$, $SnO$, $SnO_2$, $TiO_2$, $CoO$, $NiO$, $ZnO$, $Cu_2O$, $CuO$, $Ce_2O_3$, $CeO_2$, $In_2O_3$, $WO_3$, $V_2O_5$, alone or as a mixture.

The semiconductor can optionally be doped with one or more elements chosen from metal elements, such as for example elements V, Ni, Cr, Mo, Fe, Sn, Mn, Co, Re, Nb, Sb, La, Ce, Ta or Ti, non-metal elements, such as for example C, N, S, F or P, or by a mixture of metal and non-metal elements.

The porous monolith obtained according to the invention has a mesoporous volume, the pore diameter of which is between 0.2 and 50 nm, of between 0.05 and 1 ml/g, preferably between 0.1 and 0.5 ml/g.

The porous monolith obtained according to the invention has a macroporous volume, the pore diameter of which is greater than 50 nm and less than or equal to 5000 nm, preferably greater than 50 nm and less than or equal to 2000 nm, of between 0.01 and 1 ml/g, preferably between 0.05 and 0.5 ml/g.

Without being limiting in nature, the monolith with multimodal porosity prepared according to the invention may advantageously be used in photocatalysis for the production of dihydrogen by dissociation of water.

The following examples illustrate the invention without limiting the scope thereof.

EXAMPLES

Example 1: Monolith A (not in Accordance with the Invention)

A powder of $TiO_2$ (P25 Degussa, mean particle size 21 nm, Aldrich™) is introduced at ambient temperature into a nitric acid solution at pH=1.5 with stirring, so as to obtain a $TiO_2$ particle concentration of 750 g/l.

The suspension obtained is poured into a Petri dish 5 cm in diameter and 1 cm high.

A heat treatment is then carried out at 120° C. for 1 h, then 180° C. for 2 h, then 500° C. for 3 h with a temperature increase slope of 0.1° C./min.

A monolith A, based on $TiO_2$, with a pore population centered about 23 nm and a total pore volume of 0.38 ml/g is finally obtained.

Example 2: Monolith (not in Accordance with the Invention)

A powder of $CeO_2$ (mean particle size <25 nm, Aldrich™) is introduced at ambient temperature into a nitric acid solution at pH=1.5 with stirring, so as to obtain a $CeO_2$ particle concentration of 750 g/l.

The suspension obtained is poured into a Petri dish 5 cm in diameter and 1 cm high.

A heat treatment is then carried out at 120° C. for 1 h, then 180° C. for 2 h, then 500° C. for 3 h with a temperature increase slope at 0.1° C./min.

A monolith B, based on $CeO_2$, with a pore population centered about 31 nm and a total pore volume of 0.45 ml/g is finally obtained.

Example 3: Monolith C (in Accordance with the Invention)

50 ml of ethanol (absolute, Aldrich™) and 500 mg of PVP (K90, Aldrich™) are mixed in a 250 ml three-necked round-bottomed flask equipped with a magnetic stirrer. The mixture is degassed under a nitrogen stream with stirring for approximately 1 hour at ambient temperature.

Furthermore, 5.5 ml of styrene (purity >99%, Aldrich™) and 75 mg of AIBN (purity 98%, Aldrich™) are mixed in a 25 ml Erlenmeyer flask. The mixture is degassed under a nitrogen stream without stirring for approximately 1 hour at ambient temperature.

The content of the round-bottomed flask is brought to 85° C., then the styrene/AIBN mixture is added with a syringe. The stirring and heating are maintained for 24 h.

The mixture is then washed three times by centrifugation with distilled water and, finally, an amount of water is added to the polystyrene particles obtained in order to have a concentration of 165 g/l in the suspension.

By scanning microscopy analysis, the mean diameter of the spherical polystyrene particles is measured at 1850 nm.

A second suspension is prepared by mixing 10 g of $TiO_2$ (P25 Degussa, mean particle size 21 nm, Aldrich™) with 13.3 ml of an aqueous solution of nitric acid at pH=1.5 at ambient temperature, so as to obtain a suspension with a $TiO_2$ concentration of 750 g/l.

The $TiO_2$ suspension is mixed with 2.5 g of the polystyrene particle suspension, then the mixture is poured into a Petri dish 5 cm in diameter and 1 cm high.

A heat treatment is then carried out at 120° C. for 1 h, then 180° C. for 2 h, then 500° C. for 3 h with a temperature increase slope of 0.1° C./min.

Finally, a monolith C, based on $TiO_2$, is obtained with a pore population centered about 27 nm and a pore population centered about 1100 nm and a mesoporous volume of 0.38 ml/g and a macroporous volume of 0.29 ml/g, i.e. a total pore volume of 0.67 ml/g.

Example 4: Monolith D (in Accordance with the Invention)

40 ml of ethanol (absolute, Aldrich™), 10 ml of distilled water and 500 mg of PVP (K90, Aldrich™) are mixed in a 250 ml three-necked round-bottomed flask equipped with a magnetic stirrer. The mixture is degassed under a nitrogen stream with stirring for approximately 1 hour at ambient temperature.

Furthermore, 5.5 ml of styrene (purity >99%, Aldrich™) and 75 mg of AIBN (purity 98%, Aldrich™) are mixed in a 25 ml Erlenmeyer flask. The mixture is degassed under a nitrogen stream without stirring for approximately 1 hour at ambient temperature.

The content of the round-bottomed flask is brought to 75° C., then the styrene/AIBN mixture is added with a syringe. The stirring and the heating are maintained for 24 h.

The mixture is then washed three times by centrifugation with distilled water, and finally an amount of water is added to the polystyrene particles obtained in order to have a concentration of 165 g/l in the suspension.

By scanning microscopy analysis, the average diameter of the spherical polystyrene particles is measured at 640 nm.

A second suspension is prepared by mixing 10 g of $TiO_2$ (P25 Degussa, mean particle size 21 nm, Aldrich™) with 13.3 ml of an aqueous solution of nitric acid at pH=1.5 at ambient temperature, so as to obtain a suspension with a $TiO_2$ concentration of 750 g/l.

The $TiO_2$ suspension is mixed with 8.47 g of the polystyrene particle suspension, then the mixture is poured into a Petri dish 5 cm in diameter and 1 cm high.

A heat treatment is then carried out at 120° C. for 1 h, then 180° C. for 2 h, then 500° C. for 3 h with a temperature increase slope of 0.1° C./min.

Finally, a monolith D, based on $TiO_2$, is obtained with a pore population centered about 28 nm and a pore population centered about 280 nm and a mesoporous volume of 0.45 ml/g and a macroporous volume of 0.37 ml/g, i.e. a total pore volume of 0.82 ml/g.

Example 5: Monolith E (in Accordance with the Invention)

40 ml of ethanol (absolute, Aldrich™), 10 ml of distilled water and 500 mg of PVP (K90, Aldrich™) are mixed in a 250 ml three-necked round-bottomed flask equipped with a magnetic stirrer. The mixture is degassed under a nitrogen stream with stirring for approximately 1 hour at ambient temperature.

Furthermore, 5.5 ml of styrene (purity >99%, Aldrich™) and 75 mg of AIBN (purity 98%, Aldrich™) are mixed in a 25 ml Erlenmeyer flask. The mixture is degassed under a nitrogen stream without stirring for approximately 1 hour at ambient temperature.

The content of the round-bottomed flask is brought to 75° C., then the styrene/AIBN mixture is added with a syringe. The stirring and the heating are maintained for 24 h.

The mixture is then washed three times by centrifugation with distilled water, and finally an amount of water is added to the polystyrene particles obtained in order to have a concentration of 165 g/l in the suspension.

By scanning microscopy analysis, the average diameter of the spherical polystyrene particles is measured at 640 nm.

A second suspension is prepared by mixing 10 g of $CeO_2$ (mean particle size <25 nm, Aldrich™) with 13.3 ml of an aqueous solution of nitric acid at pH=1.5 at ambient temperature, so as obtain a suspension with a $CeO_2$ concentration of 750 g/l.

The $CeO_2$ suspension is mixed with 8.52 g of the polystyrene particle suspension, then the mixture is poured into a Petri dish 5 cm in diameter and 1 cm high.

A heat treatment is then carried out at 120° C. for 1 h, then 180° C. for 2 h, then 500° C. for 3 h with a temperature increase slope of 0.1° C./min.

Finally, a monolith E, based on $CeO_2$, is obtained with a pore population centered about 32 nm and a pore population centered about 290 nm and a mesoporous volume of 0.3 ml/g and a macroporous volume of 0.45 ml/g, i.e. a total pore volume of 0.76 ml/g.

Example 6: Use of the Solids for the Photocatalytic Production of Dihydrogen by Dissociation of Water in the Gas Phase The monoliths A, B, C, D and E are subjected to a test of photocatalytic production of dihydrogen by dissociation of water in the gas phase in a continuous flow-through bed steel reactor equipped with an optical window made of quartz and with a frit opposite the optical window, on which the solid is deposited.

The monoliths are placed on the frit, their diameter being equal to the diameter of the reactor. The surface irradiated for all the photocatalysts is $8.042477 \times 10^{-04}$ m². The tests are carried out at ambient temperature under atmospheric pressure. An argon flow rate of 3 ml/min crosses a water saturator before being distributed in the reactor. The reduction of dihydrogen gas produced resulting from the photocatalytic reduction of the water entrained in the saturator is monitored by an analysis of the effluent every 4 minutes by micro gas chromatography. The UV-visible irradiation source is supplied by a Xe—Hg lamp (Asahi™, MAX302™). The irradiation power is always maintained at 80 W/m² for a wavelength range of between 315 and 400 nm. The duration of the test is 20 hours.

The photocatalytic activities are expressed in μmol of dihydrogen produced per hour and per gram of solid. They are average activities over the whole of the duration of the tests. The results are reported in table 1 (below).

TABLE 1 performance levels of the monoliths in terms of average activity for the production of dihydrogen from a mixture of argon and $H_2O$ in the gas phase

| Photocatalyst | | Average $H_2$ activity (μmol/h/$g_{TiO2}$) |
|---|---|---|
| Monolith A (not in accordance) | $TiO_2$ | 0.21 |
| Monolith B (not in accordance) | $CeO_2$ | 0.13 |
| Monolith C (in accordance) | $TiO_2$ | 0.62 |
| Monolith D (in accordance) | $TiO_2$ | 1.12 |
| Monolith E (in accordance) | $CeO_2$ | 0.86 |

The activity values show that the solids prepared according to the invention systematically exhibit the best performance levels when they are used in photocatalytic production of dihydrogen by dissociation of water.

The invention claimed is:

1. A process comprising preparing a porous monolith comprising between 10% and 100% by weight of a semiconductor relative to the total weight of the porous monolith, and comprising a mesoporous volume, the pore diameter of which is between 0.2 and 50 nm, of 0.05 to 1 ml/g, and a macroporous volume, the pore diameter of which is greater than 50 nm and less than or equal to 5000 nm, of between 0.01 and 1 ml/g, which process comprises the following:
   a) a first aqueous suspension containing polymer particles is prepared;
   b) a second aqueous suspension containing particles of least one inorganic semiconductor is prepared;
   c) the two aqueous suspensions prepared in a) and b) are mixed in order to obtain a paste;
   d) a heat treatment of the paste obtained in c) is carried out in order to obtain said porous monolith, said heat treatment being carried out under air at a temperature of 300 to 1000° C. for 1 to 72 h.

2. The process as claimed in claim 1, wherein a heat treatment under air of the paste obtained in c) is carried out by carrying out three temperature plateaus, a first plateau carried out at a temperature of 70 to 130° C. for 1 to 12 h, and a second plateau carried out at a temperature of 130° C. to 220° C. for 1 to 12 h, and a third plateau carried out at a temperature of 250 to 700° C. for 1 to 12 h.

3. The process as claimed in claim 1, wherein the aqueous suspension obtained in a) contains 20 to 500 g/l of polymer particles.

4. The process as claimed in claim 1, wherein the aqueous suspension obtained in b) contains 200 to 900 g/l of semiconductor particles.

5. The process as claimed in claim 1, wherein, in c), the weight ratio between the first aqueous suspension containing the polymer particles and the second aqueous suspension containing the semiconductor particles is 0.05 to 1.

6. The process as claimed in claim 1, wherein the polymer particles are in the form of spheres with a diameter of 0.1 to 5 μm.

7. The process as claimed in claim 1, wherein the polymer particles are made of polystyrene.

8. The process as claimed in claim 7, wherein the polystyrene polymer particles are prepared according to the following:
  i) a solution of ethanol and polyvinylpyrrolidone (PVP) is prepared, which solution is degassed under a nitrogen stream for at least one hour, the weight ratio of ethanol to PVP being 50 to 200;
  ii) the solution is heated to a temperature of 50 to 90° C.;
  iii) a reactive mixture of styrene and of a polymerization initiator is prepared, which mixture is degassed under nitrogen for at least one hour, the weight ratio of styrene to initiator being 30 to 300;
  iv) the reactive mixture obtained in iii) is added to the solution obtained in ii) at a temperature of 50 to 90° C., and the mixture obtained is stirred at a temperature of 50 to 90° C. for 1 hour to 48 hours;
  v) the suspension obtained in step iv) is washed at least twice with water;
  vi) the polymer particles are recovered by filtration or centrifugation.

9. The process as claimed in claim 1, wherein the inorganic semiconductor is in the form of a powder.

10. The process as claimed in claim 9, wherein the inorganic semiconductor powder comprises particles with a diameter of 5 to 200 nm.

11. The process as claimed in claim 1, wherein the semiconductor is a metal oxide.

12. The process as claimed in claim 11, wherein the metal of the inorganic semiconductor is an element of groups IB, IIB, IVA, VA, VIA, IVB, VB, VIB, VIIIB or IIIA or a mixture thereof.

13. The process as claimed in claim 12, wherein the semiconductor is $Fe_2O_3$, SnO, $SnO_2$, $TiO_2$, CoO, NiO, ZnO, $Cu_2O$, CuO, $Ce_2O_3$, $CeO_2$, $In_2O_3$, $WO_3$, $V_2O_5$ or a mixture thereof.

14. The process as claimed in claim 1, wherein the semiconductor is doped with one or more metal elements, non-metal elements, or by a mixture of metal and non-metal elements.

15. The process as claimed in claim 14, wherein the semiconductor is doped with V, Ni, Cr, Mo, Fe, Sn, Mn, Co, Re, Nb, Sb, La, Ce, Ta, Ti, C, N, S, F, P or a mixture thereof.

* * * * *